(No Model.)

S. POTTS.
Apparatus for Driving Millstone Spindles.

No. 238,432. Patented March 1, 1881.

WITNESSES:
Chas. Nida.
C. Sedgwick

INVENTOR:
S. Potts
BY Munn & Co.
ATTORNEYS.

UNITED STATES PATENT OFFICE.

SAMUEL POTTS, OF MINNEAPOLIS, MINNESOTA.

APPARATUS FOR DRIVING MILLSTONE-SPINDLES.

SPECIFICATION forming part of Letters Patent No. 238,432, dated March 1, 1881.

Application filed June 19, 1880. (No model.)

*To all whom it may concern:*

Be it known that I, SAMUEL POTTS, of Minneapolis, Hennepin county, Minnesota, have invented a new and Improved Apparatus for Driving Millstone-Spindles, of which the following is a specification.

Figure 1:
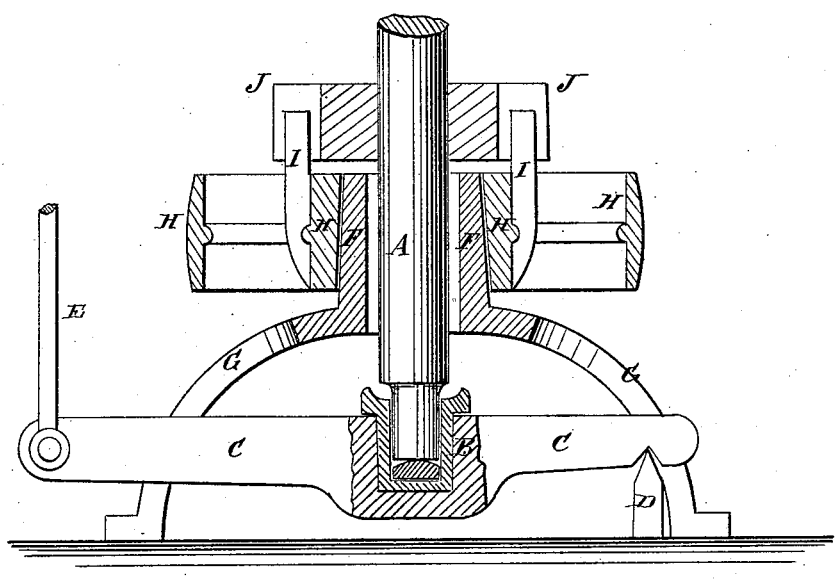
Figure 2:
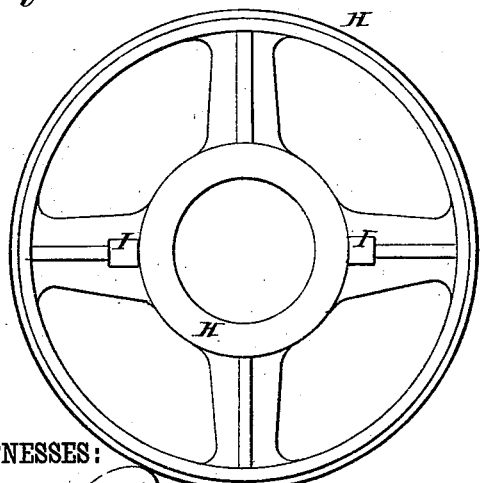
Figure 3:
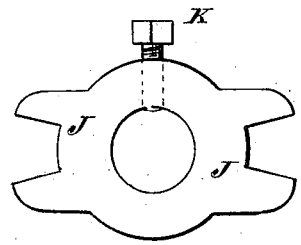

Figure 1 is a sectional elevation of the improvement. Fig. 2 is a plan view of the pulley detached. Fig. 3 is a plan view of the driver detached.

Similar letters of reference indicate corresponding parts.

The object of this invention is to furnish an improved apparatus for driving millstone-spindles, so constructed as to take the side draft of the driving-belt off the spindles, and thus make it easier to keep the spindles vertical and the millstones in balance.

The invention consists in constructing an apparatus for driving a millstone-spindle, of a bearing and its supporting-stand, a pulley having projecting lugs to receive a driver, and a driver whereby the spindle will be driven from the pulley and will be protected from the side draft of the driving-belt, as will be hereinafter described.

A represents the spindle, the lower part of which runs in a step, B, attached to the lever C. One end of the lever C is pivoted to a stud, D, attached to the bridge-tree or other supporting frame-work, and its other end is supported by a screw-rod, E, or other suitable means.

The spindle A passes up through a bearing, F, formed upon or firmly attached to a stand or supporting-frame G, the base of which is firmly bolted to the bridge-tree or other supporting frame-work, so as to leave the foot of the spindle and its adjusting mechanism unobstructed. The cavity of the bearing F is made a little larger than the spindle A, so that the said spindle will pass through the said bearing without touching it.

H is the pulley, the hub of which fits and revolves upon the bearing F, so that the side draft of the driving-belt will be sustained by the bearing F and its stand G. The outer surface of the bearing F and the inner surface of the hub of the pulley H are slightly tapered, so that as the said surfaces wear the pulley H may settle down to take up the wear.

Upon the upper end of the hub of the pulley H are formed, or to it are attached, lugs I, to receive the forked ends of the driver J, so that the said driver will be carried around by and with the pulley H in its revolution.

Through the center of the driver J is formed a hole, through which the spindle A passes, and the said driver is secured to the said spindle by a set-screw, K, so that the driver J will carry the spindle A with it in its revolution. The driver J may be made of any convenient form, and may be formed upon or attached to the spindle A as a collar. With this construction the pulley H will drive the spindle A without communicating to it any side draft from the driving-belt.

Having thus described my invention, I claim as new and desire to secure by Letters Patent—

1. An apparatus for driving a millstone-spindle, constructed substantially as herein shown and described, consisting of the bearing F, lever C, the stand G, the pulley H, having the lugs I, and the driver J, as set forth.

2. In an apparatus for driving a millstone-spindle, the combination, with the spindle A, of the bearing F, the stand G, the pulley H, having lugs I, and the driver J, substantially as herein shown and described, whereby the spindle will be protected from the side draft of the driving-belt, as set forth.

SAMUEL POTTS.

Witnesses:
EUGENE A. ARNOLD,
JAS. ASPDEN.